(12) United States Patent
Park et al.

(10) Patent No.: US 8,464,760 B2
(45) Date of Patent: Jun. 18, 2013

(54) VALVE UNIT, REACTION APPARATUS WITH THE SAME, AND METHOD OF FORMING VALVE IN CHANNEL

(75) Inventors: Jong-myeon Park, Yongin-si (KR); Jeong-gun Lee, Yongin-si (KR)

(73) Assignee: Samsung Electronic Co., Ltd., Suwon-Si (KR)

( * ) Notice: Subject to any disclaimer, the term of this patent is extended or adjusted under 35 U.S.C. 154(b) by 1077 days.

(21) Appl. No.: 11/770,762

(22) Filed: Jun. 29, 2007

(65) Prior Publication Data

US 2008/0042096 A1 Feb. 21, 2008

(30) Foreign Application Priority Data

Aug. 16, 2006 (KR) .......................... 10-2006-0077127
Sep. 25, 2006 (KR) .......................... 10-2006-0092926

(51) Int. Cl.
*F15C 1/04* (2006.01)

(52) U.S. Cl.
USPC ........................................... 137/828; 251/11

(58) Field of Classification Search
USPC .................... 251/11, 129.06; 137/251.1, 825, 137/827, 831, 833; 422/99, 100, 103
See application file for complete search history.

(56) References Cited

U.S. PATENT DOCUMENTS

| | | | |
|---|---|---|---|
| 5,869,002 A | 2/1999 | Limon et al. | |
| 2002/0027133 A1 | 3/2002 | Kellogg et al. | |
| 2003/0156991 A1* | 8/2003 | Halas et al. | 422/100 |
| 2004/0007275 A1* | 1/2004 | Hui Liu et al. | 137/828 |
| 2005/0109396 A1* | 5/2005 | Zucchelli et al. | 137/67 |
| 2006/0219308 A1* | 10/2006 | Oh et al. | 137/827 |
| 2007/0092409 A1* | 4/2007 | Beatty et al. | 422/100 |

FOREIGN PATENT DOCUMENTS

| | | |
|---|---|---|
| EP | 1 855 038 A2 | 11/2007 |
| JP | 50-101927 | 8/1975 |
| JP | 1180244 A | 7/1989 |
| JP | 9305048 A | 11/1997 |
| JP | 2000514928 A | 11/2000 |
| JP | 2001509437 A | 7/2001 |
| JP | 200236196 A | 2/2002 |
| JP | 2002215241 A | 7/2002 |
| JP | 2003503716 A | 1/2003 |
| JP | 2003240757 A | 8/2003 |
| JP | 2004100800 A | 4/2004 |

(Continued)

OTHER PUBLICATIONS

Japanese Patent Office, Office Action issued Jun. 12, 2012 in counterpart Japanese Application No. 2007-206912.

(Continued)

*Primary Examiner* — John K Fristoe, Jr.
*Assistant Examiner* — Marina Tietjen
(74) *Attorney, Agent, or Firm* — Sughrue Mion, PLLC

(57) ABSTRACT

A valve unit, a reaction apparatus with the same, and a method of forming a valve by injecting a valve material into a channel are provided. The valve unit comprises a fluid channel constituting a flow path of a fluid and having a portion containing a first area of a first dimension ("D1") and a second area of a second dimension ("D2"), wherein D1<D2, the second area is located on one side of the first area, and the first area has a distance of G in the direction of the fluid channel; and a valve formed in the first area of the fluid channel by filling the first area and made of a phase changeable valve material.

41 Claims, 15 Drawing Sheets

FOREIGN PATENT DOCUMENTS

| | | |
|---|---|---|
| JP | 2004-537695 A | 12/2004 |
| JP | 2005300333 A | 10/2005 |
| JP | 2006-508790 A | 3/2006 |
| JP | 2006-133683 A | 5/2006 |
| JP | 2006328143 A | 12/2006 |
| WO | WO 2004/050242 A2 | 6/2004 |
| WO | WO 2004/074694 A1 | 9/2004 |
| WO | 2005036182 A1 | 4/2005 |
| WO | 2005107947 A1 | 11/2005 |

OTHER PUBLICATIONS

Japanese Patent Office, Communication dated Nov. 27, 2012 issued in counterpart Japanese Application No. 2007-206912.

* cited by examiner

VALVE UNIT, REACTION APPARATUS WITH THE SAME, AND METHOD OF FORMING VALVE IN CHANNEL

CROSS-REFERENCE TO RELATED PATENT APPLICATIONS

This application claims priority from Korean Patent Application Nos. 10-2006-0077127, filed on Aug. 16, 2006 and 10-2006-0092926, filed on Sep. 25, 2006 in the Korean Intellectual Property Office, the disclosures of which are incorporated herein in their entirety by reference.

BACKGROUND OF THE INVENTION

1. Field of the Invention

Apparatuses and methods consistent with the present invention relate to a valve unit for closing a flow path of a fluid and timely opening the flow path such that the fluid flows along a channel, a reaction apparatus with the same, and a method of forming a valve for opening and closing a flow path of a fluid in a channel.

2. Description of the Related Art

A minute channel constituting a flow path for a fluid is formed in a substrate (i.e., a lab-on-a-chip) used for a biochemical reaction, for example, a lysis reaction or polymerase chain reaction (PCR). A valve unit that closes the minute channel such that the fluid cannot flow and timely opens the minute channel to allow the fluid to flow may be provided in the substrate.

A substrate for a biochemical reaction introduced in Anal. Chem. Vol. 76, p. 1824~1831, 2004 and another substrate for a biochemical reaction introduced in the same article, pp. 3740~3748 are provided with a valve formed of only paraffin wax, and provided with a heating member for melting the paraffin wax. However, a large amount of paraffin wax is needed to close the minute channel, and a large sized heating member is needed to melt the large amount of paraffin wax, which make it difficult to miniaturize and integrate a substrate for a biochemical reaction. Also, the melting process of the paraffin wax takes a lot of heating time and it is difficult to accurately control a point of time at which the channel is opened.

SUMMARY OF THE INVENTION

Exemplary embodiments of the present invention provide a valve unit having a small-sized valve for opening a closed channel, a reaction apparatus with the same, and a method of forming a valve in a channel.

Exemplary embodiments of the present invention also provide a valve unit in which a closed channel is opened by the irradiation of electromagnetic waves, such as a laser beam, a reaction apparatus with the same, and a method of forming a valve in a channel.

According to an aspect of the present invention, there is provided a valve unit comprising a fluid channel constituting a flow path of a fluid and having a portion containing a first area of a first dimension ("D1") and a second area of a second dimension ("D2"), wherein D1<D2, the second area is located on one side of the first area, and the first area has a distance of G in the direction of the fluid channel; and a valve formed in the first area of the fluid channel by filling the first area and made of a phase changeable valve material.

In one aspect of the present invention, the portion of the fluid channel further contains a third area of a third dimension ("D3"), D1<D3, and the third area is located on the other side of the first area.

According to another aspect of the present invention, a reaction apparatus is provided, the reaction apparatus comprising: a substrate formed of a first layer and a second layer, the first and the second layers being bonded together to form the substrate; a fluid channel formed in the substrate and constituting a flow path of a fluid; a fluid chamber formed in the channel to receive the fluid; and a valve unit closing and opening the channel, wherein the valve unit includes: a portion of the fluid channel which contains a first area of a first dimension ("D1") and a second area of a second dimension ("D2"), wherein D1<D2, the second area is located on one side of the first area, and the first area has a distance of G in the direction of the fluid channel; and a valve formed in the first area of the fluid channel by filling the first area and made of a phase changeable valve material.

According to still another aspect of the present invention, there is provided a method of forming a valve in a channel, the method comprising: providing a fluid channel which constitutes a flow path of a fluid and has a portion containing a first area of a first dimension ("D1") and a second area of a second dimension ("D2"), wherein D1<D2, the second area is located on one side of the first area, and the first area has a distance of G in the direction of the fluid channel; and introducing a phase changeable valve material to the first area. The introduction of the valve material to the first area may be performed by injecting the valve material into the first hole in the first layer. The portion of the fluid channel may further contain a third area of a third dimension ("D3"), D1<D3, and the third area is located on the other side of the first area.

The fluid channel may be formed in a substrate, and the substrate is formed of a first layer and a second layer, which are bonded together to form the substrate, wherein the first, second and third areas of the fluid channel are configured by a first hole in the first layer and a pair of second holes in the second layer, in which at least one of the spaced from the first hole by a distance G to form the first area. According to another aspect of the present invention, there is provided a method of forming a valve in a channel, the method comprising: providing a first layer having a first trench on one surface, the first layer having a first hole in the first trench; providing a second layer having a second trench on one surface, the second trench forming together with the first trench of the first layer a fluid channel and the second trench having a pair of second holes, in which at least one of the second holes is located such way that it is spaced by a distance G from the first hole of the first layer, when the first trench of the first layer and the second trench of the second layer form the fluid channel; introducing a valve material on the trench between the pair of the second holes; and bonding the first layer to the second layer to form the fluid channel which has a portion containing a first area of a first dimension ("D1") and a second area of a second dimension ("D2"), wherein D1<D2, the second area is located on one side of the first area, and the first area has a distance of G in the direction of the fluid channel, wherein the valve material is positioned in the first area. An energy may be applied to the first or the second layer to melt the valve material, which then fills the first area.

The phase changeable valve material may comprise a phase change material and a plurality of minute heating particles The apparatus and valve units may have an extra energy source to heat the valve material to change its viscosity or phase.

The external energy source may be a laser light source irradiating laser.

The laser light source may include a laser diode.

The laser irradiated from the laser light source may be a pulse electromagnetic wave having at least 1 mJ/pulse.

The laser irradiated from the laser light source may be a continuous wave electromagnetic wave having an output of at least 10 mV.

The laser irradiated from the laser light source may have a wavelength of 750 to 1300 nm.

The minute heating particles may be dispersed in a hydrophobic carrier oil.

The minute heating particles may contain a ferromagnetic material.

The minute heating particles may be in the form of at least one of a polymer particle, a quantum dot, and a magnetic bead. The magnetic bead may include at least one selected from Fe, Ni, Cr, and an oxide thereof.

The phase change material may be at least one selected from wax, gel, and a thermoplastic resin.

The wax may be at least one selected from paraffin wax, microcrystalline wax, synthetic wax, and natural wax.

The gel may be at least one selected from polyacrylamide, polyacrylates, polymethacrylates, and polyvinylamides.

The thermoplastic resin may be at least one selected from COC, PMMA, PC, PS, POM, PFA, PVC, PP, PET, PEEK, PA, PSU, and PVDF.

The valve gap or the first area where the valve is formed may have a distance of 200 to 500 μm.

The reaction apparatus may further include a revolving member rotating the substrate, and the fluid may be pumped by a centrifugal force caused by rotation of the substrate.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF EXEMPLARY EMBODIMENTS OF THE INVENTION

Hereinafter, the present invention will now be described in detail with reference to the accompanying drawings.

Figure 1:
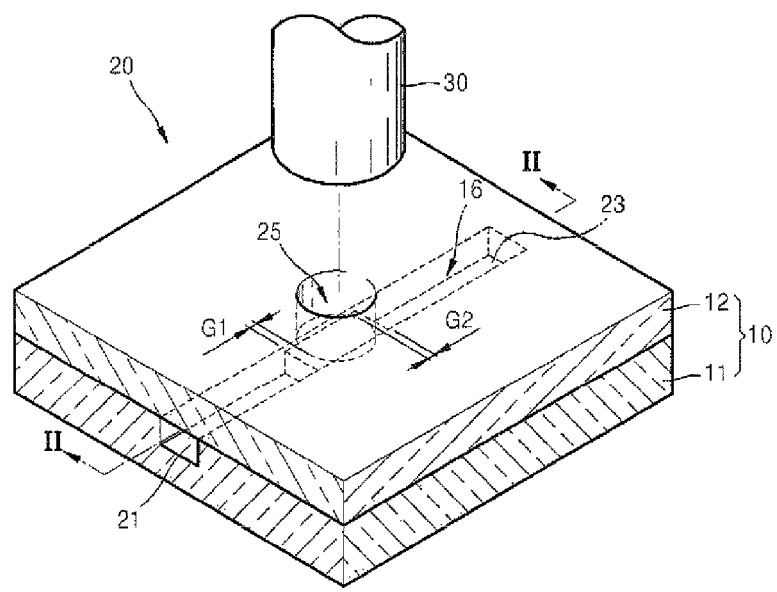
FIG. 1 is a perspective view of a valve unit according to an embodiment of the present invention.
Figure 2:
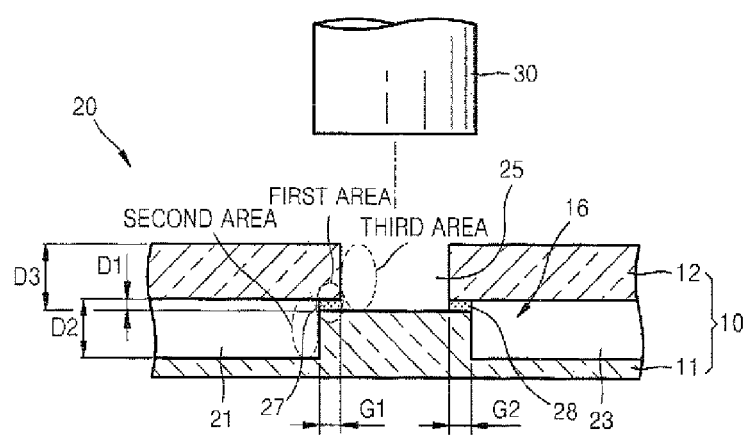
FIG. 2 is a cross-sectional view of the valve unit taken along line II-II of FIG. 1.

FIG. 1 is a perspective view of a valve unit according to an embodiment of the present invention, and FIG. 2 is a cross-sectional view of the valve unit taken along line II-II of FIG. 1.

Referring to FIGS. 1 and 2, a valve unit 20 according to an exemplary embodiment of the present invention includes a fluid channel 16 constituting a flow path of a fluid and having a portion containing a first area of a first dimension ("D1"), a second area of a second dimension ("D2"), and a third area of a third dimension ("D3"), and a valve 27, 28 formed in the first area of the fluid channel 16 by filling the first area. The valve 27, 28 is made of a phase changeable valve material, which may include a heat generating particles. The dimensions D1 is smaller than D2 and D3. The first area is sided by the second area and the third area on each side, and the first area has a distance of G1 (or G2) in the direction of the fluid channel 16.

The fluid channel 16 may be formed in a substrate 10, which is comprised of a first layer 12 and a second layer 11. The first layer 12 and second layer 11 are bonded together to form a substrate 10. The first layer 12 and second layer 11 may be bonded together by anodic bonding, ultrasonic welding, double-sided adhesive tape (not shown) and so on. The first layer 12 and second layer 11 each may have a trench which constitute the fluid channel 16 when the first and second layers 12, 11 are bonded together to form a substrate.

The first, second and third areas may be configured by a first hole 25 formed in the first layer 12 and a pair of second holes 21 and 23 formed in the second layer 11. At least one of the second holes 21, 23 is spaced from the first hole 25 by a distance G (G1 or G2) to form the first area. The distance G is smaller than the dimensions of D2 and D3. The distance G of the first area is in the range of 200 to 500 μm. The D2 and D3 each are in the range of 1 to 3 mm. The distance G may be referred to as "valve gap" sometimes. The second holes 21 and 23 forms the fluid channel 16. A first area having the first dimension D1 is formed between a pair of second holes 21 and 23 and a first hole 25.

The first hole 21 may be a through hole, through which the valve material is introduced or injected into to form a valve 27, 28. The through hole may be covered by a cover or lid layer (not shown), after the valve material is introduced or after a valve is formed. As will be discussed hereinafter, the valve material changes its phase or viscosity depending on the temperature.

Figure 3A:
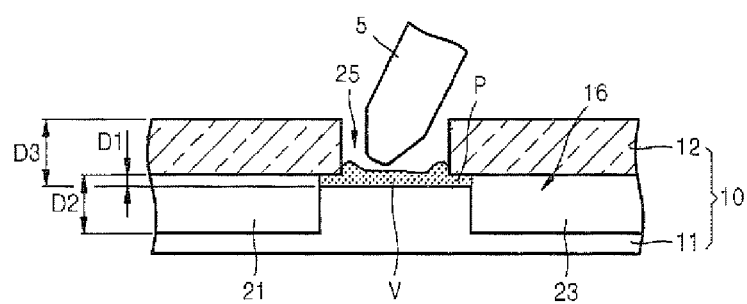
FIGS. 3A and 3B are views illustrating processes of fabricating the valve unit of FIG. 2.
Figure 3B:
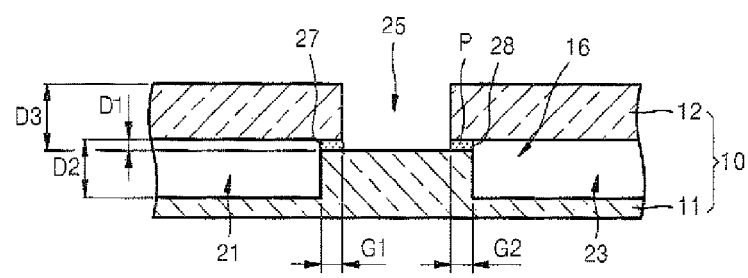

FIGS. 3A and 3B are sectional views sequentially illustrating a method of forming a valve in a channel of FIG. 2. Hereinafter, the method of forming the valve in the channel 16 will be described with reference to FIGS. 3A and 3B.

Referring to FIG. 3A, the melted valve material V is injected into the channel 16 through the first hole (sometimes, referred to as "valve material injection hole") 25. A tool such as a pipette 5 may be used to inject the valve material V. The valve material V hardens into a solid state at room temperature, and melts into a flowable state at a high temperature of approximately 70° C. or more. The valve material V diffuses along the channel 16, and remains in the first area of G1 or G1. Any remainder of the valve material flows toward the second holes 21 and 23, where the internal dimension D2 is greater than the first area of D1, and diffuses.

Referring to FIG. 3B, the valve material V injected into the substrate 10 is hardened in the first area G1 and G2 to become respectively a valve 27 and 28. The valve 27 may serve as a main valve and the valve 28 may serve as an auxiliary valve 28 that close the channel 16. The distance G1 and G1 have a length of 200 to 500 μm such that the valves 27 and 28 can withstand the pressure of a fluid and prevent leakage of the fluid. The depth D2 may range from 10 nm to 100 mm in the present exemplary embodiment.

The valve material V contains a phase change material in a solid state or a high viscosity state (not necessarily solid state) and a plurality of minute heating particles P uniformly dispersed in the phase change material. The phase change material may be, for example, wax. When the wax is heated, the wax melts into a liquid state and its volume expands. Paraffin wax, microcrystalline wax, synthetic wax, natural wax, or the like may be employed as the wax.

The phase change material may be gel or a thermoplastic resin. Polyacrylamide, polyacrylates, polymethacrylates, polyvinylamides, or the like may be employed as the gel. Alternatively, cyclic olefin copolymer (COC), polymethylmethacrylate (acrylic) (PMMA), polycarbonate (PC), polystyrene (PS), polyacetal engineering polymers (POM), perfluoroalkoxy (PFA), polyvinyl chloride (PVC), polypropylene (PP), polyethylene terephthalate (PET), polyetheretherketone (PEEK), polyamide (PA), polysulfone (PSU), polyvinylidene difluoride (PVDF), or the like may be employed as the thermoplastic resin.

The minute heating particles P have a diameter of several tens to several hundreds of nm so as to freely pass through the channel 16. When being irradiated by electromagnetic waves, such as a laser beam, the temperature of the minute heating particles P rapidly increases due to the radiant energy of the electromagnetic wave and the minute heating particles emit heat. The minute heating particles P are uniformly dispersed in the wax. In this regard, the minute heating particles P may have a core containing metal components and a hydrophobic surface structure. For example, the minute heating particles P may have a molecular structure including cores formed of Fe and a plurality of surfactants combined to surfaces of the Fe cores.

In general, the minute heating particles P are kept dispersed in a carrier oil. The carrier oil may be hydrophobic such that the minute heating particles having the hydrophobic surface structure are uniformly dispersed. A valve material V may be fabricated by mixing the carrier oil including the dispersed minute heating particles with the wax. The form of the minute heating particles P is not limited to the polymer particle, and may be a quantum dot or a magnetic bead. The magnetic bead may include a ferromagnetic material, such as Fe, Ni, Cr, or an oxide thereof.

Figure 4:
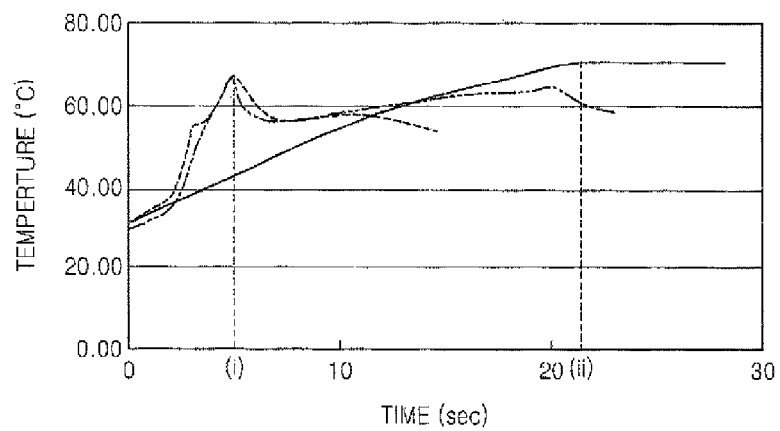
FIG. 4 is a graph illustrating the time taken to reach a melting point when the laser is irradiated to pure paraffin wax and paraffin wax including minute heating particles heated by laser irradiation.

FIG. 4 is a graph illustrating the time taken to reach a melting point when the laser is irradiated to pure paraffin wax and paraffin wax including minute heating particles heated by laser irradiation.

Referring to FIG. 4, a solid line shows a temperature of pure (100%) paraffin wax, a dotted line shows a temperature of paraffin wax containing 50% impurities (minute heating particles), in which a carrier oil containing dispersed minute heating particles having an average diameter of 10 nm and paraffin wax are mixed in a ratio of 1:1, and a chain double-dashed line shows a temperature of paraffin wax containing 20% impurities (minute heating particles), in which a carrier oil containing dispersed minute heating particles having an average diameter of 10 nm and paraffin wax are mixed in a ratio of 1:4. A laser having a wavelength of 808 nm is used in the experiment. The melting point of the paraffin wax is approximately 68 to 74° C. Referring to FIG. 4, pure paraffin wax reaches a melting point 20 seconds or more after the laser is irradiated (refer to (ii)). On the other hand, the paraffin wax containing 50% impurities (minute heating particles) and paraffin wax containing 20% impurities (minute heating particles) are rapidly heated by laser irradiation, and then reach a melting point in approximately 5 seconds (refer to (i)).

Referring back to FIG. 1, the valve unit 20 further includes a laser light source, which is an exemplary external energy source for irradiating electromagnetic waves toward the pair of valves 27 and 28. The laser light source 30 may include a laser diode. A laser light source that can irradiate a pulse laser having energy of at least 1 mJ/pulse may be employed as the laser light source 30 when a pulse laser is irradiated, and a laser light source that can irradiate a continuous wave laser having an output of at least 10 mW may be employed as the laser light source 30 when a continuous wave laser is irradiated.

The whole first layer 12 or at least a peripheral portion of the first hole 25 should be transparent such that a laser irradiated from the laser light source 30 above the substrate 10 can be transmitted to the main valve 27 and the auxiliary valve 28. Therefore, the first layer (sometimes, referred to as "upper plate") 12 may be formed of glass or transparent plastic. The second layer (sometimes, referred to as "lower plate") 11 may be formed of the same material as the upper plate 12, or may be formed of silicon (Si), which has excellent heat transform performance.

Figure 5A:
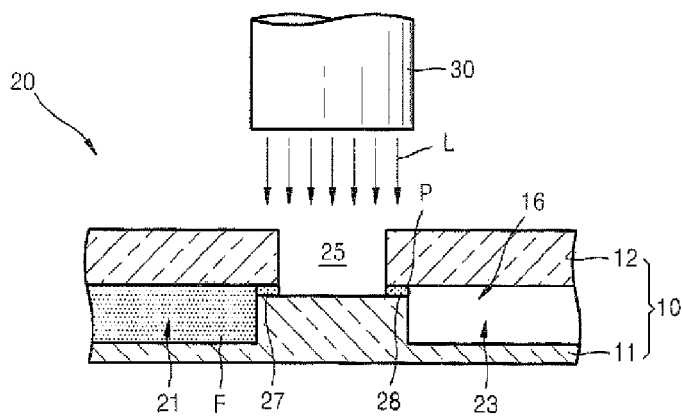
FIGS. 5A and 5B are cross-sectional views sequentially illustrating operations of the valve unit of FIG. 2.
Figure 5B:
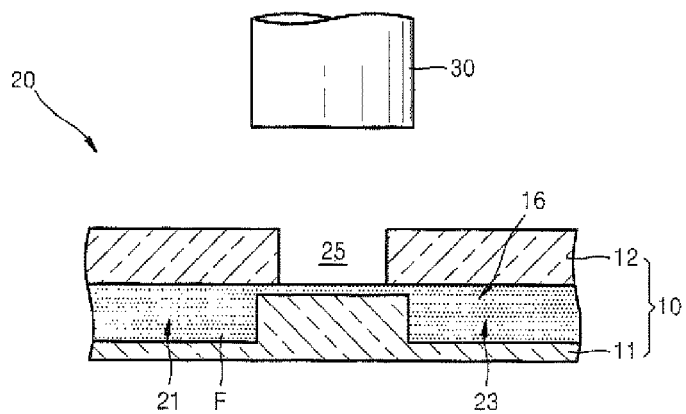

FIGS. 5A and 5B are sectional views sequentially illustrating the operation of the valve unit of FIG. 2.

Referring to FIG. 5A, a fluid F flowing from an upstream position of the channel 16 is blocked by the main valve 27 closing the channel 16, and thus cannot flow in a downstream direction in the channel 16. The auxiliary valve 28 blocks a flow of fluid F that is not blocked by the main valve 27. When laser L is irradiated from the laser light source 30 to the main valve 27 and the auxiliary valve 28, the valves 27 and 28 are rapidly melted by heating of the minute heating particles P, and the valves 27 and 28 are destroyed. Referring to FIG. 5B, the channel 16 is opened to allow the fluid F to flow in a downstream direction in the channel 16.

FIGS. 6A through 6D are views sequentially illustrating a method of fabricating the valve unit according to another embodiment of the present invention.

Figure 6A:
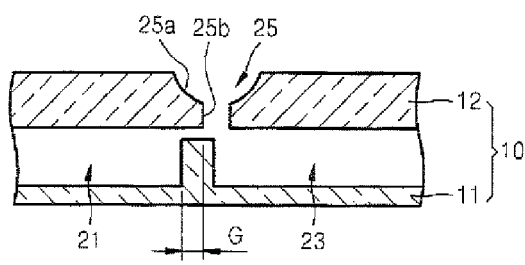
FIGS. 6A through 6D are views sequentially illustrating a method of fabricating a valve unit according to another embodiment of the present invention.

Referring to FIG. 6A, a substrate 10 formed of a first layer 12 and a second layer 11 is provided. The first layer 12 has a first hole 25 in a shape which has wider opening 25a and a narrow neck 25b. The first hole 25 may be used as a valve material injection hole. The second layer 11 has a pair of second holes 21 and 23. The first layer and the second layer each may have a trench which forms a fluid channel when the are bonded to form a substrate. The first and second layers are bonded in a way that at least one of the second holes is spaced from the first hole by a distance G.

Figure 6B:
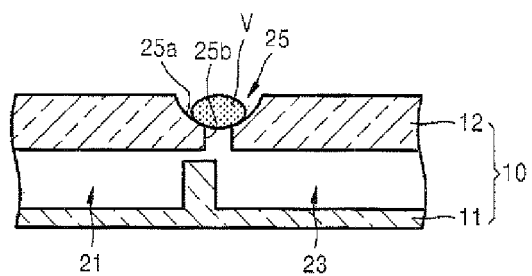
Figure 6C:
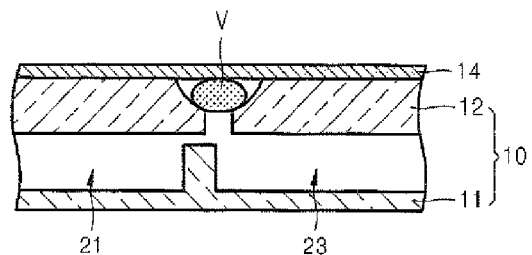

Referring to FIG. 6B, a valve material V is introduced into the first hole 25, followed by applying a cover layer 14 onto the first layer 12 (FIG. 6C) to seal the first hole 25. The cover layer 14 may be formed of a clear material.

Figure 6D:
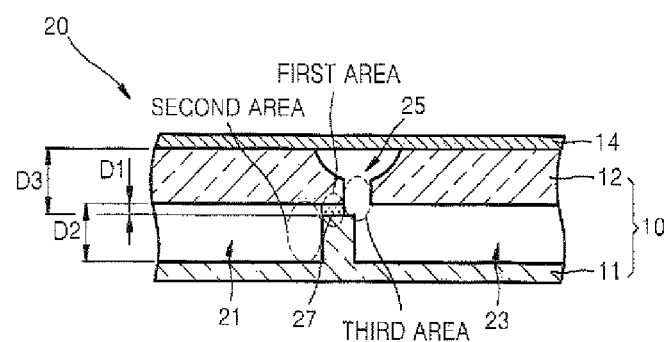

Referring to FIG. 6D, a heat is applied to the substrate to melt the valve material. The melted valve material will flow into the fluid channel and form a valve on a first area of internal dimension D1, which is sided by a second area of internal dimension D2 and a third area of internal dimension D3 on each side The first, second and third areas are configured by the alignment of the first hole 25 in the first layer 12 and the second holes 21, 23 in the second layer 11. The valve material V is hardened in the first area G to become a valve 27.

Figure 7A:
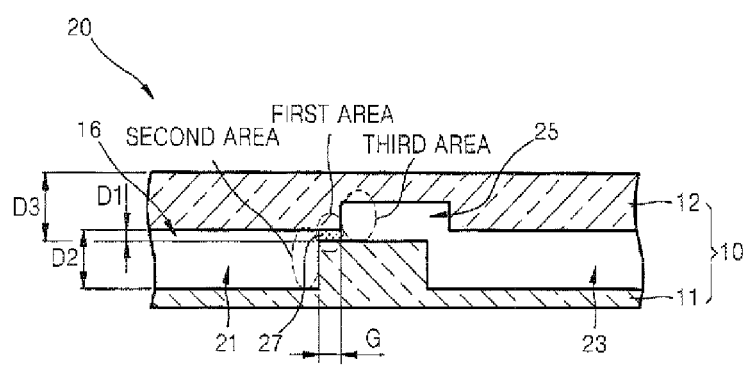
FIGS. 7A through 7C are cross-sectional views of a valve unit according to another embodiment of the present invention.
Figure 7B:
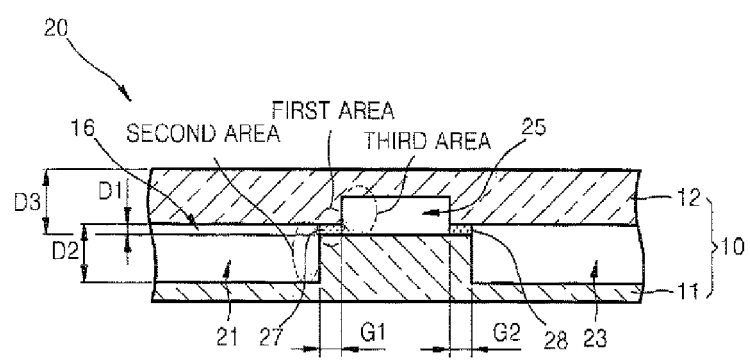
Figure 7C:
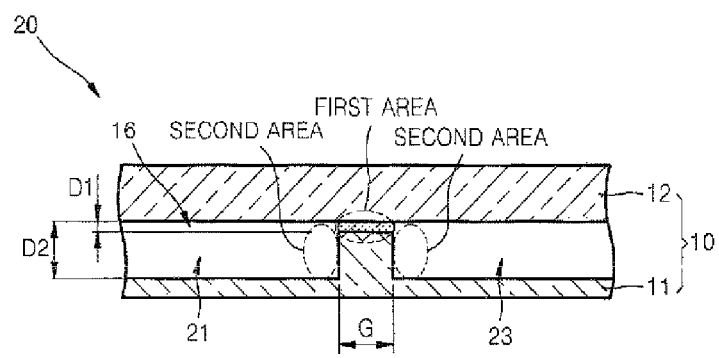

FIGS. 7A through 7C are cross-sectional views of a valve unit according to another embodiment of the present invention.

With reference FIG. 7A, a valve unit 20 includes a fluid channel 16 constituting a flow path of a fluid and having a portion containing a first area of a first dimension ("D1"), a second area of a second dimension ("D2"), and a third area of a third dimension ("D3"), and a valve 27 formed in the first area of the fluid channel 16 by filling the first area. The valve 27 is made of a phase changeable valve material, which may include a heat generating particles. The dimensions D1 is smaller than D2 and D3. The first area is sided by the second area and the third area on each side, and the first area has a distance of G in the direction of the fluid channel 16.

The fluid channel 16 may be formed in a substrate 10, which is comprised of a first layer 12 and a second layer 11. The first layer 12 and second layer 11 each may have a trench which constitute the fluid channel 16 when the first and second layers 12, 11 are bonded together to form a substrate.

The first, second and third areas may be configured by a first hole 25 formed in the first layer 12 and a pair of second holes 21 and 23 formed in the second layer 11. At least one of the second holes 21, 23 is spaced from the first hole 25 by a distance G to form the first area. The distance G is smaller than the dimensions of D2 and D3. The distance G of the first area is in the range of 200 to 500 μm. The second holes 21 and 23 forms the fluid channel 16.

Referring to FIG. 7B, the valve unit 20 according to another embodiment of the present invention can include valves 27 and 28 of the dimension D1 on both sides of the first hole 25.

In addition, referring to FIG. 7C, the valve unit 20 according to another embodiment of the present invention includes a first area of the first dimension D1 and a second area of a second dimension D2, and a valve 27 having a distance G and formed of a phase-changeable valve material on the first area. The second dimension D2 is greater than the first dimension D1, and the first area and the second area are adjacent to each other. The first area and the second area are formed by a pair of second holes 21 and 23. The pair of second holes 21 and 23 form a fluid channel 16, and are formed in the second layer 11 of the substrate 10. The valve unit 20 does not include the first hole 25 and the third area (refer to FIG. 7A) formed by the first hole 25.

Figure 8A:
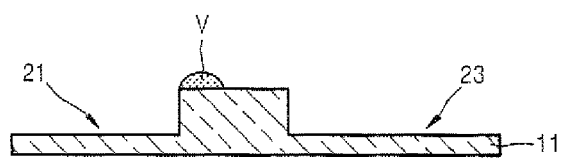
FIGS. 8A and 8B are views illustrating a method of fabricating the valve unit of FIG. 7A.
Figure 8B:
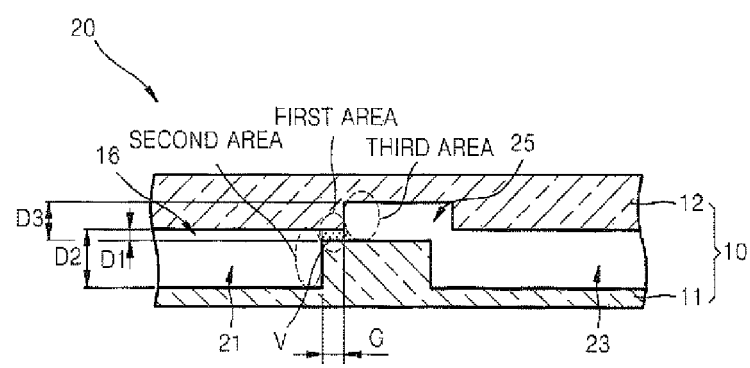

FIGS. 8A and 8B are sectional views sequentially illustrating a method of forming a valve in a channel of FIG. 7A, in accordance to an embodiment of the present invention. Referring to FIG. 8A, there is provided a second layer 11 having a second trench (not shown) on one surface. The second layer 11 has a pair of second holes 21 and 23. Alternatively, a protrusion may be formed on the trench. In this case, the trench will be considered as a hole 21, 23. A first layer 12 which has a first trench (not shown) on one surface is provided. The first layer has a first hole 25 in the first trench. A valve material V is applied onto the trench between the second holes 21 and 23 (or on the protruded portion of the trench) of the second layer 11.

Referring to FIG. 8B, the first layer 12 is overlayered onto the second layer 11 in such a way that at least one of the second holes 21, 23 is located with a space by a distance G from the first hole 25 of the first layer 12. The bonding of the first layer 12 to the second layer 11, results in a formation of substrate with a fluid channel 16, which has a portion containing a first area of a first dimension ("D1"), a second area of a second dimension ("D2"), and a third area of a third dimension ("D3"), wherein D1<D2 and D1<D3, the first area is sided by the second area and the third area on each side, and the first area has a distance of G in the direction of the fluid channel. The valve material V is positioned in the first area.

Then, an energy is applied to the first or the second layer from, for example an external energy source, such as electromagnetic energy source to melt the valve material. The melted valve material fills the first area to form a valve.

Figure 9:
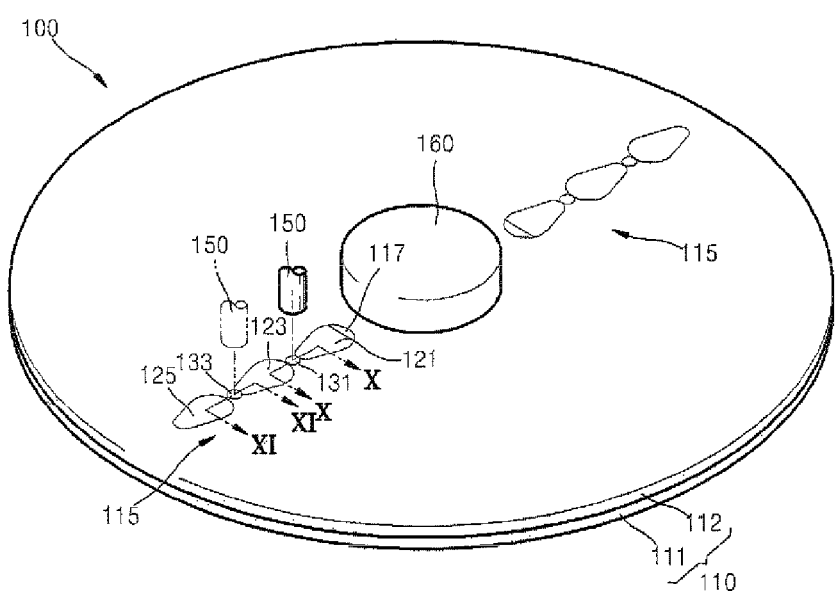
FIG. 9 is a perspective view of a reaction apparatus according to another embodiment of the present invention.
Figure 10:
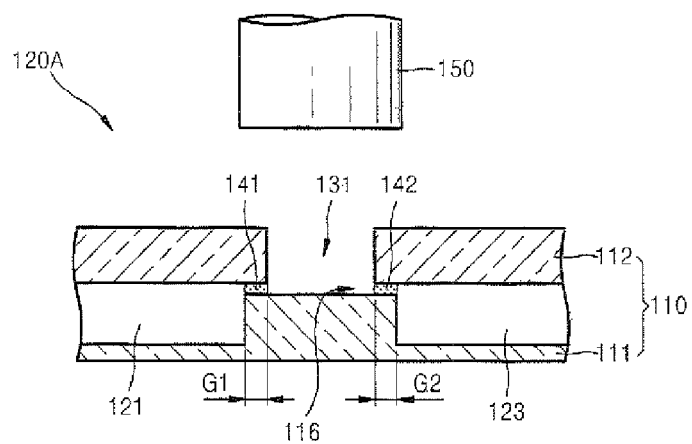
FIG. 10 is a cross-sectional view of the reaction apparatus taken along line X-X of FIG. 9.
Figure 11:
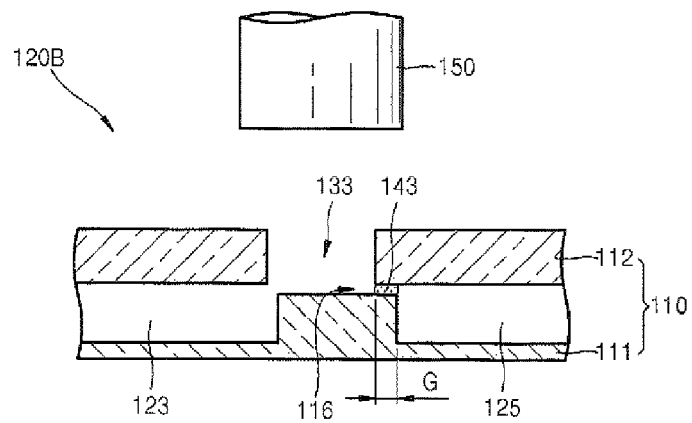
FIG. 11 is a cross-sectional view of the reaction apparatus taken along line XI-XI of FIG. 9.

FIG. 9 is a perspective view of a reaction apparatus according to another exemplary embodiment of the present invention, FIG. 10 is a sectional view of a valve unit taken along the X-X direction of FIG. 9 according to another embodiment of the present invention, and FIG. 11 is a sectional view of a valve unit taken along the XI-XI direction of FIG. 9 according to a further embodiment of the present invention.

Referring to FIG. 9, a reaction apparatus 100 according to another embodiment of the present invention includes a substrate 110 of a circular shape, a spindle motor 160 for rotating the substrate 110, and a laser light source 150 irradiating a laser beam toward the substrate 110. The substrate 110 is provided with a plurality of reaction units 115 that include a fluid inlet hole 117 into which a fluid flows, chambers 121, 123 and 125 for receiving the fluid, and a channel 116 (refer to FIGS. 10 and 11) for connecting the chambers 121, 123 and 125. Although FIG. 9 illustrates the substrate 110 provided with a pair of reaction units, the substrate 110 may be provided with one reaction unit, three reaction units or more.

A reaction of separating, condensing, and purifying components of a fluid, a PCR reaction, a lysis reaction, etc. can occur and be observed in the chambers 121, 123 and 125. The first chamber 121, the second chamber 123, and the third chamber 125 are disposed in a line from a central portion to the circumference of the substrate 110. The substrate 110 includes lower and upper plates 111 and 112 bonded to each other, and the chambers 121, 123 and 125 are formed in the lower plate 111. The spindle motor 160 is an example of a member for rotating the substrate 110. A fluid flowing into the substrate 110 through the fluid inlet hole 117 is pumped toward the circumference of the substrate 110 by a centrifugal force caused by rotation of the substrate 110.

The reaction apparatus 100 includes a valve unit 120A (refer to FIG. 10) for closing and timely opening a portion of the channel 116 between the first and second chambers 121 and 123 illustrated in FIG. 11 and a valve unit 120B (refer to FIG. 11) for closing and timely opening a portion of the channel 116 between the second and third chambers 123 and 125 illustrated in FIG. 11.

Referring to FIG. 10, the valve unit 120A includes the first and second chambers 121 and 123, a first valve material injection hole 131, a pair of valves 141 and 142, and a laser light source 150. The first valve material injection hole 131 is formed to penetrate the upper plate 112 such that it is connected with a portion of the channel 116 between the pair of chambers 121 and 123. The pair of the valves 141 and 142 are formed of the valve materials V (refer to FIG. 3A) hardened in the channel 116. The laser light source 150 irradiates a laser beam to the pair of valves 141 and 142.

The first hole ("first valve material injection hole") 131 is disposed such that it does not overlap the first and second chambers 121 and 123. The first chamber 122 is spaced from a circumferential surface of the first valve material injection hole 131 by a first valve gap G1, and the second chamber 123 is spaced from a circumferential surface of the first valve material injection hole 131 by a second valve gap G2. Some of a melted valve material V (refer to FIG. 3A) injected through the first valve material injection hole 131 remains and is hardened in the first and second valve gaps G1 and G2 to respectively form a main valve 141 and an auxiliary valve 142

The first and second chambers 121 and 123 can receive a redundant valve material as well as a fluid that is a target of a reaction.

Referring to FIG. 11, the valve unit 120B includes the second and third chambers 123 and 125, a second valve material injection hole 133, a valve 143, and the laser light source 150. The second valve material injection hole 133 is formed to penetrate the upper plate 112 such that it is connected with a portion of the channel 116 between the pair of chambers 123 and 125. The valve 143 is formed of the melted valve material V (refer to FIG. 3A) hardened in the channel 116. The laser light source 150 irradiates laser to the valve 143. The laser light source 150 may move from the first valve material injection hole 131 to the second valve material injection hole 133 when necessary, as illustrated by an imaginary line in FIG. 9. Alternatively, the laser light source 150 may be fixed above the first valve material injection hole 131, and laser may be irradiated toward the second valve material injection hole 133 using a light path changing member including, for example, at least one mirror.

The second valve material injection hole 133 is disposed such that it overlaps the second chamber 123 but does not overlap the third chamber 125. A circumferential surface of the second valve material injection hole 133 is spaced from the third chamber 125 by a valve gap G. Some of a melted valve material V (refer to FIG. 3A) injected through the second valve material injection hole 133 remains and is hardened in the valve gap G to form the valve 143 closing the channel 116. The second and third chambers 123 and 125 can receive a redundant valve material as well as a fluid that is a target of a reaction.

Figure 12A:
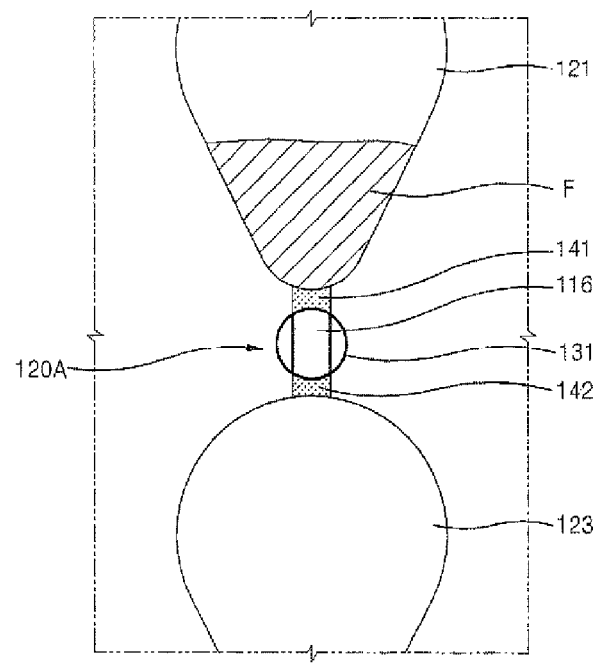
FIGS. 12A and 12B are plan views sequentially illustrating operations of the valve unit of FIG. 10.
Figure 12B:
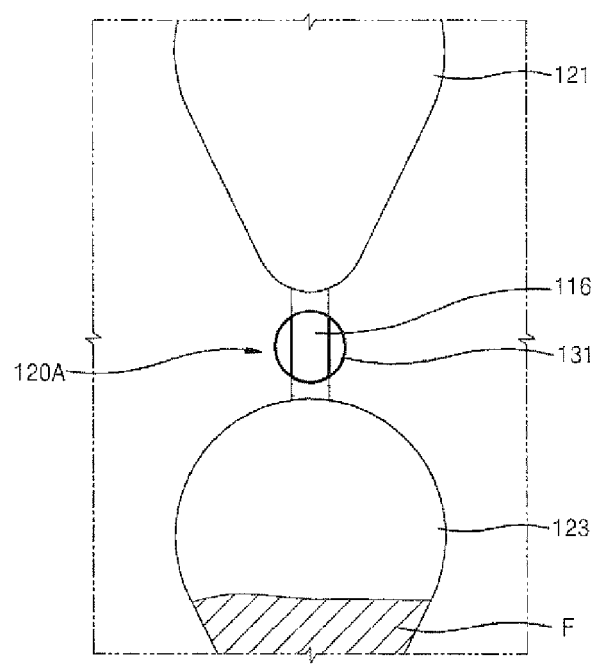

Some experiments were performed to observe the operation of the valve unit consistent with the present invention. FIGS. 12A and 12B are plan views sequentially illustrating a test result of the operation of the valve unit of FIG. 10, and FIGS. 13A and 13B are plan views sequentially illustrating a test result of the operation of the valve unit of FIG. 11.

Referring to FIG. 12A, a length of the main valve 141 corresponding to the first valve gap G1 is 238 µm, and a length of the auxiliary valve 142 corresponding to the second valve gap G2 is 342 µm. The valve materials V (refer to FIG. 3A) constituting the valves 141 and 142 are paraffin wax containing 50% impurities (minute heating particles), in which a carrier oil containing dispersed minute heating particles having an average diameter of 10 nm and paraffin wax are mixed in a ratio of 1:1. Since a portion of the channel 116 between the first and second chambers 121 and 123 is closed by the valves 141 and 142, although the substrate 110 revolves for 60 seconds at a revolution speed of 3600 rpm, a fluid F received in the first chamber 121 does not leak to the second chamber 123.

Referring to FIG. 12B, when a laser beam is irradiated toward the first valve material injection hole 131 for 1 second, and the substrate 110 is revolved for 5 seconds at a revolution speed of 3000 rpm, the valves 141 and 142 are melted to open a portion of the channel 116 between the first and second chambers 121 and 123, and thus the fluid F flows from the first chamber 121 to the second chamber 123.

Figure 13A:
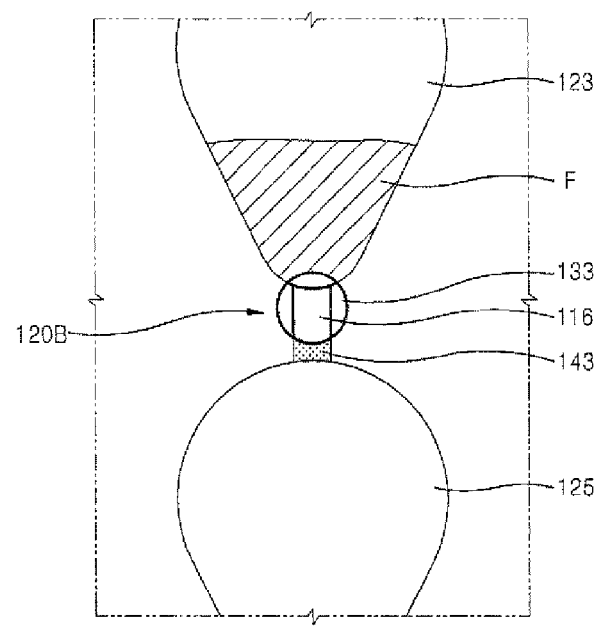
FIGS. 13A and 13B are plan views sequentially illustrating operations of the valve unit of FIG. 11.
Figure 13B:
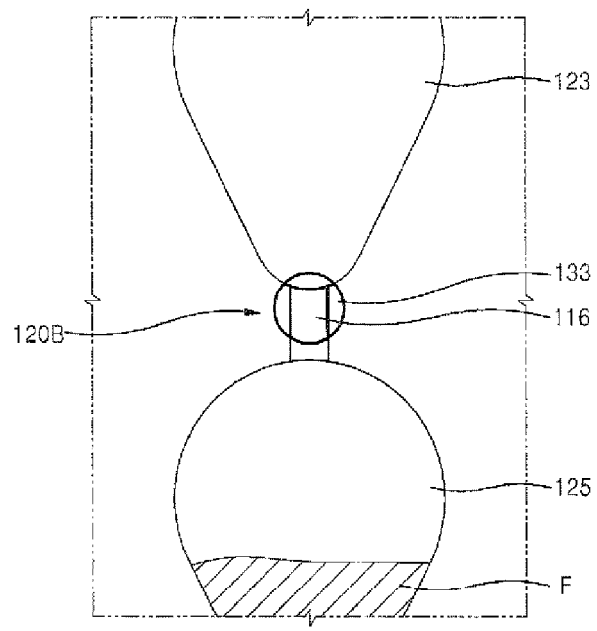

Referring to FIG. 13A, a length of the valve 143 corresponding to the valve gap G of FIG. 11 is 375 µm. The valve material V (refer to FIG. 3A) constituting the valve 143 is paraffin wax containing 50% impurities (minute heating particles), in which a carrier oil containing dispersed minute heating particles having an average diameter of 10 nm and paraffin wax are mixed in a ratio of 1:1. Since a portion of the channel 116 between the second and the third chambers 123 and 125 is closed by the valve 143, although the substrate 110 revolves for 60 seconds at a revolution of 3600 rpm, the fluid F received in the second chamber 123 does not leak to the third chamber 125.

Referring to FIG. 13B, when the laser beam is irradiated toward the second valve material injection hole 133 for 1 second, and the substrate 110 is revolved for 5 seconds at a revolution speed of 3000 rpm, the valve 143 is melted to open a portion of the channel 116 between the second and third chambers 123 and 125, and thus the fluid F flows from the second chamber 123 to the third chamber 125.

Although not illustrated, it can be observed through experimentation that the valve unit of the present invention can be applied when a fluid containing magnetic beads flows along the channel, or when a mixed fluid is separated using a density difference to flow along to the channel.

Figure 14A:
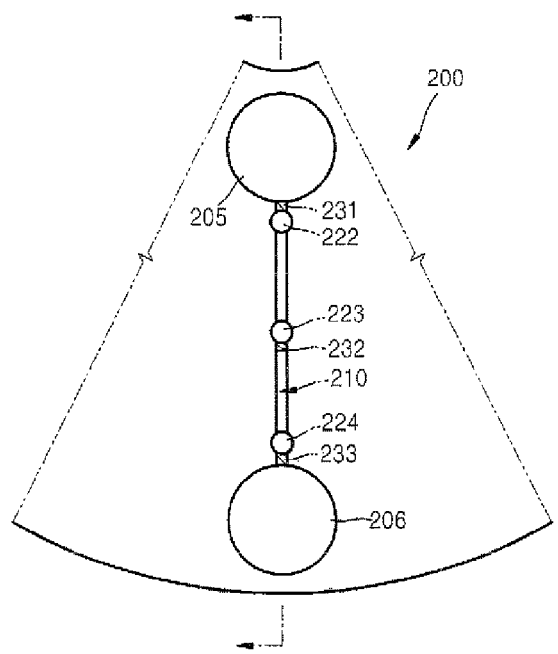
FIGS. 14A and 14B are a plan view and a cross-sectional view partially illustrating a reaction apparatus according to another embodiment of the present invention.
Figure 14B:
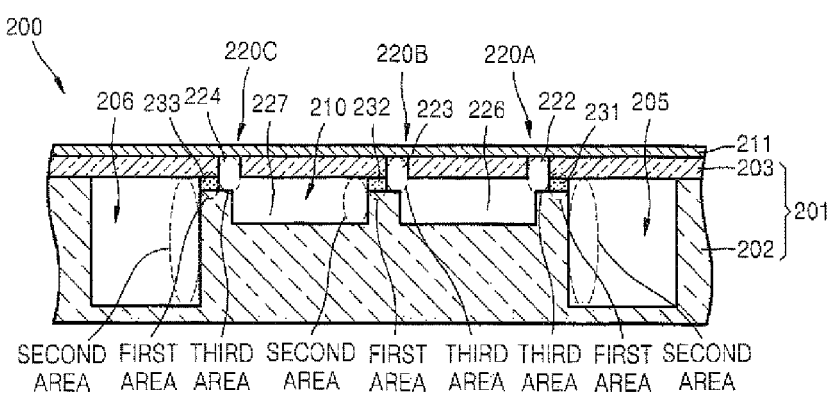
Figure 15A:
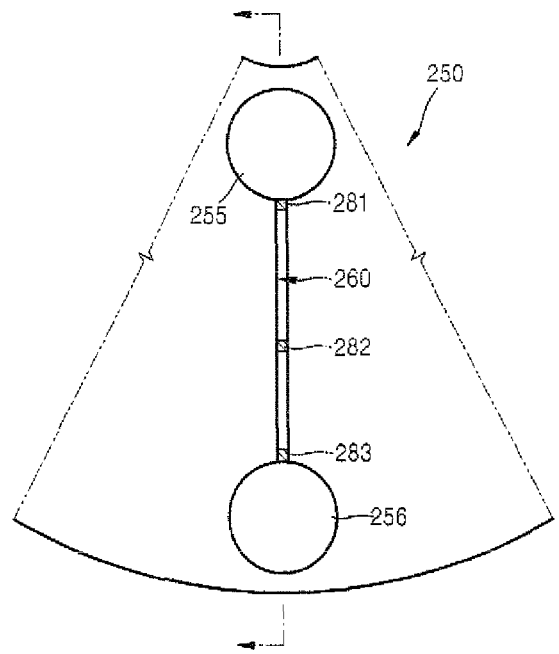
FIGS. 15A and 15B are a plan view and a cross-sectional view partially illustrating a reaction apparatus according to another embodiment of the present invention.
Figure 15B:
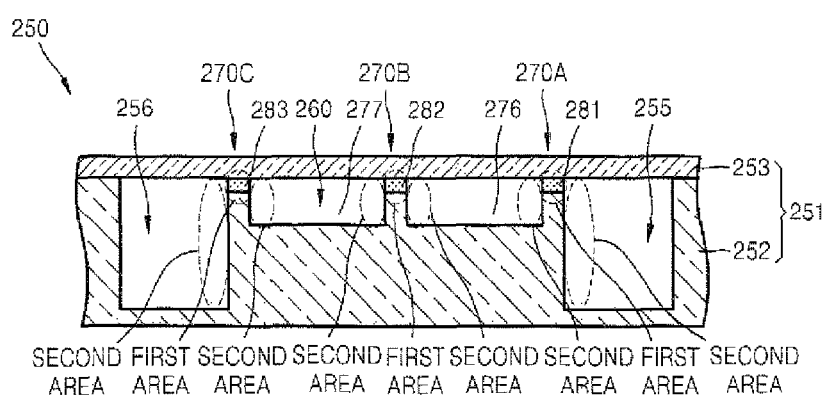

FIGS. 14A and 14B are a plan view and a cross-sectional view partially showing a reaction apparatus according to another embodiment of the present invention, and FIGS. 15A and 15B are a plan view and a cross-sectional view partially showing a reaction apparatus according to another embodiment of the present invention.

Referring to FIGS. 14A and 14B, the reaction apparatus 200 of the current embodiment also includes a substrate 201 having an upper plate 203 and a lower plate 202 that are bonded to each other like the reaction apparatus 100 shown in FIG. 9. In addition, the reaction apparatus 200 includes a pair of chambers 205 and 206 that can receive the fluid, and a fluid channel 210 forming a flow path between the chambers 205 and 206. The reaction apparatus 200 includes three valve units 220A, 220B, and 220C for sequentially opening the flow path of the fluid on the fluid channel 210. Each of the valve units 220A, 220B, and 220C has the same structure as that of the valve unit shown in FIG. 6D. In more detail, each of the valve units 220A, 220B, and 220C includes a first area, and a second area and a third area disposed on both sides of the first area. In addition, the valve units 220A, 220B, and 220C include first holes 222, 223, and 224 to which a valve material is injected, second holes 226 and 227 forming the fluid channel 210, and a cover layer 211 for closing the first holes 222, 223, and 224, in which the valve material is filled. Valves 231, 232, and 233 of the valve units 220A, 220B, and 220C are formed on the first area.

Referring to FIGS. 15A and 15B, a reaction apparatus 250 according to another embodiment of the present invention also includes a substrate 251 having an upper plate 253 and a lower plate 232 that are bonded to each other like the reaction apparatus 100 of FIG. 9. In addition, the reaction apparatus 250 includes a pair of chambers 255 and 256 receiving a fluid, and a fluid channel 260 forming a flow path between the chambers 255 and 256. The reaction apparatus 250 includes three valve units 270A, 270B, and 270C for sequentially opening the flow path of the fluid on the fluid channel 260. Each of the valve units 270A, 270B, and 270C includes the same structure as that of the valve unit of FIG. 7C. In more detail, each of the valve units 270A, 270B, and 270C includes a first area, and a pair of second areas disposed on both sides of the first area. Valves 281, 282, and 283 of the valve units 270A, 270B, and 270C are formed on the first area, and the fluid channel 260 is formed by the second holes 226 and 227 formed in the lower plate 252.

According to the present invention, since an air pump, a heating plate, etc. are not included in a substrate, it is easy to miniaturize and integrate a substrate used for a biochemical reaction.

Also, since the irradiation of electromagnetic waves, such as a laser, causes opening of the channel, the channel can be quickly opened and it is easy to accurately control a point of time at which the channel is opened. Therefore, a fluid reaction can be quickly performed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A valve unit comprising:
    a fluid channel constituting a flow path of a fluid and having a portion including a first area of a first depth and a second area of a second depth which is greater than the first depth, wherein the second area is located on one side of the first area, and the first area has a width in a direction of the fluid channel; and
    a valve material formed only in the first area of the fluid channel by filling the first area and comprising a phase changeable valve material,
    wherein a direction of the first and second depths is substantially parallel to a direction of irradiation of an external energy used for heating the phase changeable material, and
    wherein the portion of the fluid channel further contains a third area of a third depth which is greater than the first depth, and the third area is located on the other side of the first area.

2. The valve unit of claim 1, wherein the phase changeable valve material comprises a phase change material and a plurality of minute heating particles.

3. The valve unit of claim 2, wherein the minute heating particles are dispersed in a hydrophobic carrier oil.

4. The valve unit of claim 2, wherein the minute heating particles are in the form of at least one of a polymer particle, a quantum dot, and a magnetic bead.

5. The valve unit of claim 4, wherein the magnetic bead includes at least one selected from Fe, Ni, Cr, and an oxide thereof.

6. The valve unit of claim 2, wherein the phase change material is at least one selected from wax, gel, and a thermoplastic resin.

7. The valve unit of claim 6, wherein the wax is at least one selected from paraffin wax, microcrystalline wax, synthetic wax, and natural wax.

8. The valve unit of claim 6, wherein the gel is at least one selected from polyacrylamide, polyacrylates, polymethacrylates, and polyvinylamides.

9. The valve unit of claim 6, wherein the thermoplastic resin is at least one selected from cyclic olefin copolymer (COC), polymethylmethacrylate (acrylic) (PMMA), polycarbonate (PC), polystyrene (PS), polyacetal engineering polymers (POM), perfluoroalkoxy (PFA), polyvinyl chloride (PVC), polypropylene (PP), polyethylene terephthalate (PET), polyetheretherketone (PEEK), polyamide (PA), polysulfone (PSU), polyvinylidene difluoride (PVDF).

10. The valve unit of claim 1, which further comprises the external energy source which irradiates electromagnetic waves to the valve material.

11. The valve unit of claim 10, wherein the external energy source comprises a laser light source irradiating a laser beam.

12. The valve unit of claim 11, wherein the laser light source includes a laser diode.

13. The valve unit of claim 11, wherein the laser beam irradiated from the laser light source is a pulse electromagnetic wave having an energy of at least a 1 mJ/pulse.

14. The valve unit of claim 11, wherein the laser beam irradiated from the laser light source is a continuous wave electromagnetic wave having an output of at least 10 mW.

15. The valve unit of claim 11, wherein the laser beam irradiated from the laser light source has a wavelength of 750 to 1300 nm.

16. The valve unit of claim 1, wherein the width is smaller than the first depth and the second depth.

17. The valve unit of claim 1, wherein the first area has the width in the range of 200 to 500 μm.

18. The valve unit of claim 1, wherein the fluid channel is formed in a substrate, the substrate being formed of a first layer and a second layer, which are bonded together to form the substrate, wherein the first, second and third areas of the fluid channel are configured by a first hole in the first layer and a pair of second holes in the second layer, in which at least one of the second holes is spaced from the first hole by the width to form the first area.

19. The valve unit of claim 18, wherein the second holes in the second layer form the fluid channel.

20. The valve unit of claim 1, wherein the first area is recessed from a bottom of the fluid channel by the first depth.

21. A reaction apparatus comprising:
    a substrate formed of a first layer and a second layer, the first and the second layers being bonded together to form the substrate;
    a fluid channel formed in the substrate and constituting a flow path of a fluid;
    a fluid chamber formed in the channel to receive the fluid; and
    a valve unit closing and opening the channel,
    wherein the valve unit includes:
        a portion of the fluid channel which includes a first area of a first depth and a second area of a second depth which is greater than the first depth, wherein the second area is located on one side of the first area, and the first area has a width in a direction of the fluid channel; and
        a valve material formed only in the first area of the fluid channel by filling the first area and comprising a phase changeable valve material,
        wherein a direction of the first and second depths is substantially parallel to a direction of irradiation of an external energy used for heating the phase changeable material, and
        wherein the portion of the fluid channel further contains a third area of a third depth which is greater than the first depth, and the third area is located on the other side of the first area.

22. The reaction apparatus of claim 21, wherein the first, second and third areas are configured by a first hole in the first layer and a pair of second holes in the second layer, in which at least one of the second holes is spaced from the first hole by the width to form the first area.

23. The reaction apparatus of claim 22, wherein the second holes in the second layer form the fluid channel.

24. The reaction apparatus of claim 22, wherein the first hole in the first layer is used to introduce the valve material into the valve unit.

25. The reaction apparatus of claim 21, wherein the phase changeable valve material comprises a phase change material and a plurality of minute heating particles.

26. The reaction apparatus of claim 25, wherein the minute heating particles are dispersed in a hydrophobic carrier oil.

27. The reaction apparatus of claim 25, wherein the minute heating particles are in the form of at least one of a polymer particle, a quantum dot, and a magnetic bead.

28. The reaction apparatus of claim 27, wherein the magnetic bead includes at least one selected from Fe, Ni, Cr, and an oxide thereof.

29. The reaction apparatus of claim 25, wherein the phase change material is at least one selected from wax, gel, and a thermoplastic resin.

30. The reaction apparatus of claim 29, wherein the wax is at least one selected from paraffin wax, microcrystalline wax, synthetic wax, and natural wax.

31. The reaction apparatus of claim 29, wherein the gel is at least one selected from polyacrylamide, polyacrylates, polymethacrylates, and polyvinylamides.

32. The reaction apparatus of claim 29, wherein the thermoplastic resin is at least one selected from cyclic olefin copolymer (COC), polymethylmethacrylate (acrylic) (PMMA), polycarbonate (PC), polystyrene (PS), polyacetal engineering polymers (POM), perfluoroalkoxy (PFA), polyvinyl chloride (PVC), polypropylene (PP), polyethylene terephthalate (PET), polyetheretherketone (PEEK), polyamide (PA), polysulfone (PSU), polyvinylidene difluoride (PVDF).

33. The reaction apparatus of claim 21, which further comprises an external energy source which irradiates electromagnetic waves to the valve.

34. The reaction apparatus of claim 33, wherein the external energy source comprises a laser light source irradiating a laser beam.

35. The reaction apparatus of claim 34, wherein the laser light source includes a laser diode.

36. The reaction apparatus of claim 34, wherein the laser beam irradiated from the laser light source is a pulse electromagnetic wave having an energy of at least a 1 mJ/pulse.

37. The reaction apparatus of claim 34, wherein the laser beam irradiated from the laser light source is a continuous wave electromagnetic wave having an output of at least 10 mW.

38. The reaction apparatus of claim 34, wherein the laser beam irradiated from the laser light source has a wavelength of 750 to 1300 nm.

39. The reaction apparatus of claim 21, wherein the width is smaller than the first depth and the second depth.

40. The reaction apparatus of claim 21, wherein the length of the first area is in the range of 200 to 500 µm.

41. The reaction apparatus of claim 21, further comprising a revolving member rotating the substrate, wherein the fluid is pumped by a centrifugal force caused by the rotation of the substrate.

* * * * *